(12) United States Patent
Schaaf

(10) Patent No.: US 10,987,972 B2
(45) Date of Patent: Apr. 27, 2021

(54) WHEEL APPARATUS FOR SELF-PROPELLED IRRIGATION SYSTEM

(71) Applicant: Corey Schaaf, Ord, NE (US)

(72) Inventor: Corey Schaaf, Ord, NE (US)

( * ) Notice: Subject to any disclaimer, the term of this patent is extended or adjusted under 35 U.S.C. 154(b) by 80 days.

(21) Appl. No.: 16/231,162

(22) Filed: Dec. 21, 2018

(65) Prior Publication Data

US 2020/0198392 A1 Jun. 25, 2020

(51) Int. Cl.
*B60B 15/02* (2006.01)
*B60B 15/26* (2006.01)
*A01G 25/09* (2006.01)

(52) U.S. Cl.
CPC ............ *B60B 15/02* (2013.01); *A01G 25/092* (2013.01); *B60B 15/266* (2013.01); *A01G 25/09* (2013.01)

(58) Field of Classification Search
CPC ..... B60B 15/02; B60B 15/266; B60B 15/023; B60B 15/026; B60B 15/24; A01G 25/09; A01G 25/092
USPC .......................................... 239/728; 301/44.3
See application file for complete search history.

(56) References Cited

U.S. PATENT DOCUMENTS

| | | | |
|---|---|---|---|
| 652,650 A | 6/1900 | Stone | |
| 1,195,066 A | 8/1916 | Morton | |
| 1,360,451 A | 11/1920 | Scotti | |
| 1,392,866 A | 10/1921 | Clifton | |
| 1,461,951 A | 7/1923 | Tuttle | |
| 1,902,412 A | 3/1933 | Melin | |
| 1,943,620 A | 1/1934 | Murray | |
| 2,106,135 A | 1/1938 | Henry | |
| 2,280,908 A | 4/1942 | Garey | |
| 2,984,520 A | 5/1961 | Wadell | |
| 3,690,343 A | 9/1972 | Crane | |
| 5,154,490 A * | 10/1992 | Burns | .................... B62D 55/28 301/44.3 |
| 5,226,690 A | 7/1993 | Clark et al. | |
| 5,451,001 A | 9/1995 | Kumm | |
| 5,810,452 A | 9/1998 | Hawthorne et al. | |
| 8,657,215 B1 | 2/2014 | Blum | |
| 9,272,571 B2 | 3/2016 | Niblock | |
| 9,481,204 B1 | 11/2016 | Wiebe | |
| 9,561,686 B1 * | 2/2017 | Waldner | .................. B60B 15/02 |
| 9,586,443 B2 | 3/2017 | MacPherson | |
| 9,962,992 B1 | 5/2018 | Covey | |

(Continued)

*Primary Examiner* — Darren W Gorman
(74) *Attorney, Agent, or Firm* — Jeffrey L. Thompson; Thompson Law, P.A.

(57) ABSTRACT

A wheel apparatus for a self-propelled irrigation system has a center portion, a rim assembly, and a support structure disposed between the center portion and the rim assembly. The rim assembly has a plurality of rigid members spaced apart from each other with longitudinal axes that are parallel with each other and equidistant from the axis of rotation. The rigid members are cylindrical with unsupported ends, and a mounting portion between the ends is connected to an outer periphery of the support structure. The rigid members are held in a fixed position relative to the center portion by the support structure. The rigid members are arranged to contact the ground surface to support the irrigation system with spaces between the rigid members allowing mud and debris to pass freely between the rigid members during operation to enhance traction while minimizing mud from being forced out of a wheel track.

12 Claims, 5 Drawing Sheets

(56) References Cited

U.S. PATENT DOCUMENTS

| | | |
|---|---|---|
| 9,969,218 B2 | 5/2018 | Korus et al. |
| 2003/0066913 A1* | 4/2003 | Reinke .................. A01G 25/092 239/735 |
| 2011/0121090 A1 | 5/2011 | Price |
| 2013/0026819 A1* | 1/2013 | Reshad .................. B62D 55/12 305/135 |
| 2015/0151570 A1* | 6/2015 | Woolley .................. B60B 15/02 301/44.3 |

* cited by examiner

WHEEL APPARATUS FOR SELF-PROPELLED IRRIGATION SYSTEM

BACKGROUND OF THE INVENTION

Field of the Invention

The present invention relates generally to self-propelled irrigation systems, and more particularly, to an improved wheel apparatus for a self-propelled irrigation system.

Description of the Prior Art

Irrigation is used to improve production of agricultural crops in areas with insufficient rainfall. Self-propelled irrigation systems distribute irrigation water evenly over fields to ensure efficient use of limited irrigation water supplies. Typically, such systems include a water distribution pipeline connected to a water supply, and a series of spaced apart support tower assemblies that support the pipeline above the crop being irrigated. In center pivot systems, the pipeline extends radially from center pivot connected to the water supply. In linear move systems, the pipeline extends laterally from a canal feed or hose drag system connected to the water supply.

Irrigation water passing through the water distribution pipeline is forced out through a number of sprinkler heads, spray guns, drop nozzles, or the like spaced along the length of the pipeline. The support tower assemblies are supported on wheels that are driven at slow speeds to move the tower in a circular path about the central pivot, or a linear path in the case of linear move systems, to move the irrigation system over a field.

Conventional support towers for self-propelled irrigation systems include a base beam that extends transverse to the water distribution pipeline with a drive wheel assembly at each end of the base beam. The weight of the support tower and the corresponding part of the water pipeline is approximately evenly distributed between the two drive wheel assemblies. The drive wheel assemblies typically include a metal wheel rim and a pneumatic rubber tire with lug tread mounted on the wheel rim. Various other drive wheels for self-propelled irrigation systems are disclosed in the prior art that purportedly improve the flotation and traction of the drive wheels as compared to conventional pneumatic tires.

During use, the drive wheel assemblies follow the same drive wheel path through a field time-after-time and under wet and muddy conditions. As a result, deep tire tracks tend to form, which sometimes lead to the irrigation system getting stuck in the field, or uneven field surfaces that are difficult to cross with other farm equipment.

There is a need in the industry for an improved wheel apparatus for self-propelled irrigation systems that provides adequate traction while minimizing the size of the wheel tracks.

SUMMARY OF THE INVENTION

An object of the present invention is to provide an improved wheel apparatus for self-propelled irrigation systems that provides adequate traction while minimizing the size of wheel tracks.

A further object of the present invention is to provide a drive wheel apparatus that can be mounted to and used with existing drive assemblies in place of a conventional wheel and pneumatic tire assembly.

A further object of the present invention is to provide a drive wheel apparatus that has ground-contacting surfaces that minimize stresses on the sprinkler system, that allows mud and debris to clear itself from the wheel apparatus, and that minimizes the amount of mud forced out of the wheel track during operation.

A further object of the present invention is to provide a drive wheel apparatus that is relatively inexpensive to manufacture, that is strong and durable, and that is capable of a long operating life.

To accomplish these and other objects of the present invention, a wheel apparatus for a self-propelled irrigation system has a center portion, a rim assembly, and a support structure disposed between the center portion and the rim assembly. The rim assembly has a plurality of rigid members that are spaced apart from each other and have longitudinal axes that are parallel with each other and equidistant from the axis of rotation. The rigid members are cylindrical with first and second ends that are unsupported, and a mounting portion between the first and second ends is connected to an outer periphery of the support structure. The rigid members are held in a fixed position relative to the center portion by the support structure. The rigid members are arranged to contact the ground surface to support the irrigation system with spaces between the rigid members allowing mud and debris to pass freely between the rigid members during operation to enhance traction while minimizing mud from being forced out of a wheel track.

According to one aspect of the present invention, a wheel apparatus for an irrigation system is provided, comprising: a center portion configured to couple with a hub on an axle of the irrigation system, the center portion having an axis of rotation; a rim assembly comprising a plurality of rigid members that are spaced apart from each other, the rigid members having longitudinal axes that are parallel with each other and that are equidistant from the axis of rotation, and the rigid members having first and second ends and a mounting portion between the first and second ends; and a support structure disposed between the center portion and the rim assembly configured to support the rigid members in a fixed position relative to the center portion, the mounting portion of the rigid members being connected to the support structure.

According to another aspect of the present invention, a self-propelled irrigation system is provided that includes a pipeline supported above a field by at least one support tower with a plurality of wheel drive assemblies. At least one of the wheel drive assemblies comprises: a center portion coupled with a hub on a drive axle, the center portion having an axis of rotation; a rim assembly comprising a plurality of rigid members that are spaced apart from each other, the rigid members having longitudinal axes that are parallel with each other and that are equidistant from the axis of rotation, and the rigid members having first and second ends and a mounting portion between the first and second ends; and a support structure disposed between the center portion and the rim assembly configured to support the rigid members in a fixed position relative to the center portion, the mounting portion of the rigid members being connected to the support structure.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A self-propelled irrigation system 10 and wheel apparatus 11 according to the present invention will now be described in detail with reference to FIGS. 1 to 9 of the drawings.

Figure 1:
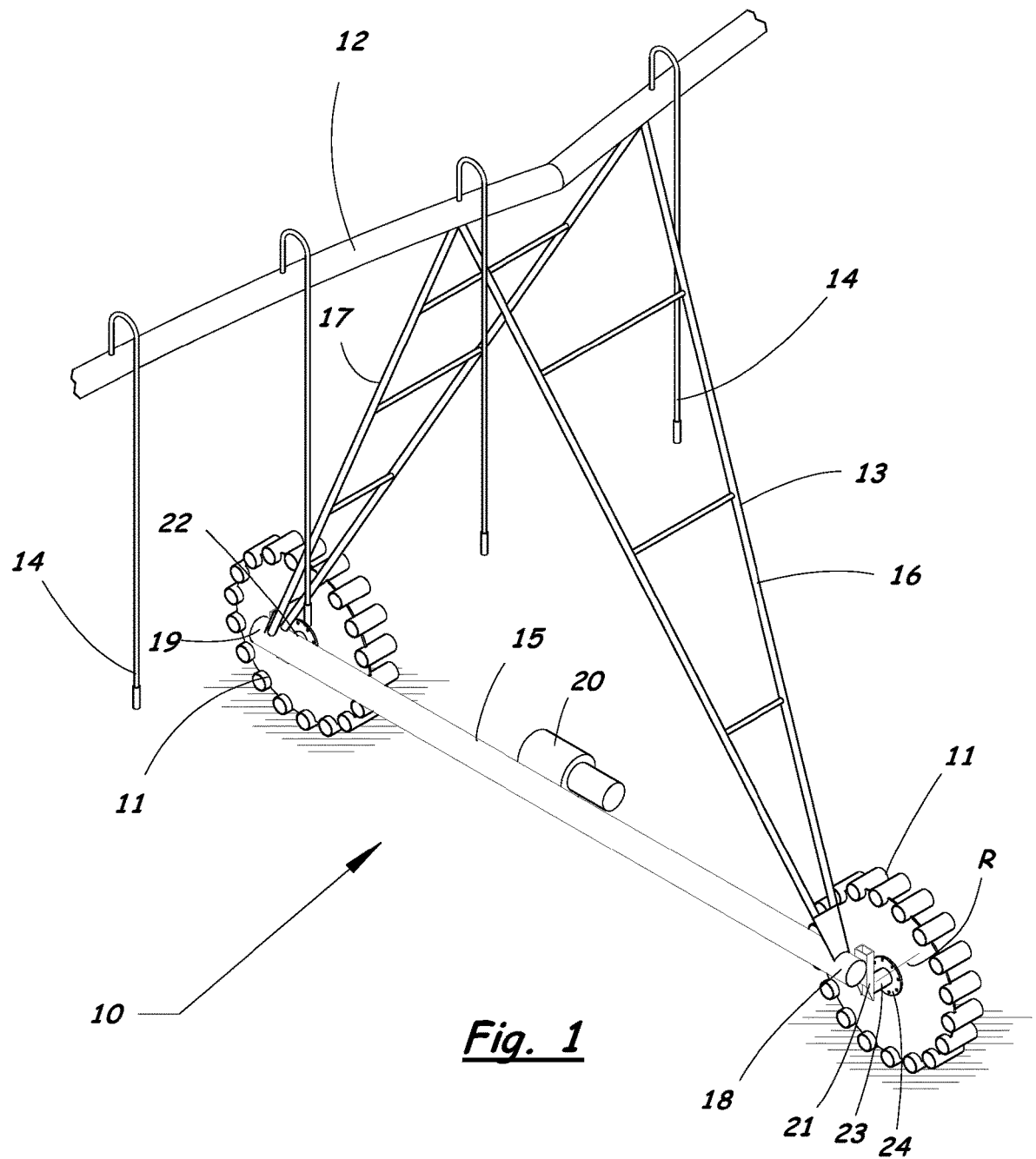
FIG. 1 is a perspective view of a self-propelled irrigation system supported by a wheel apparatus of the present invention.
Figure 2:
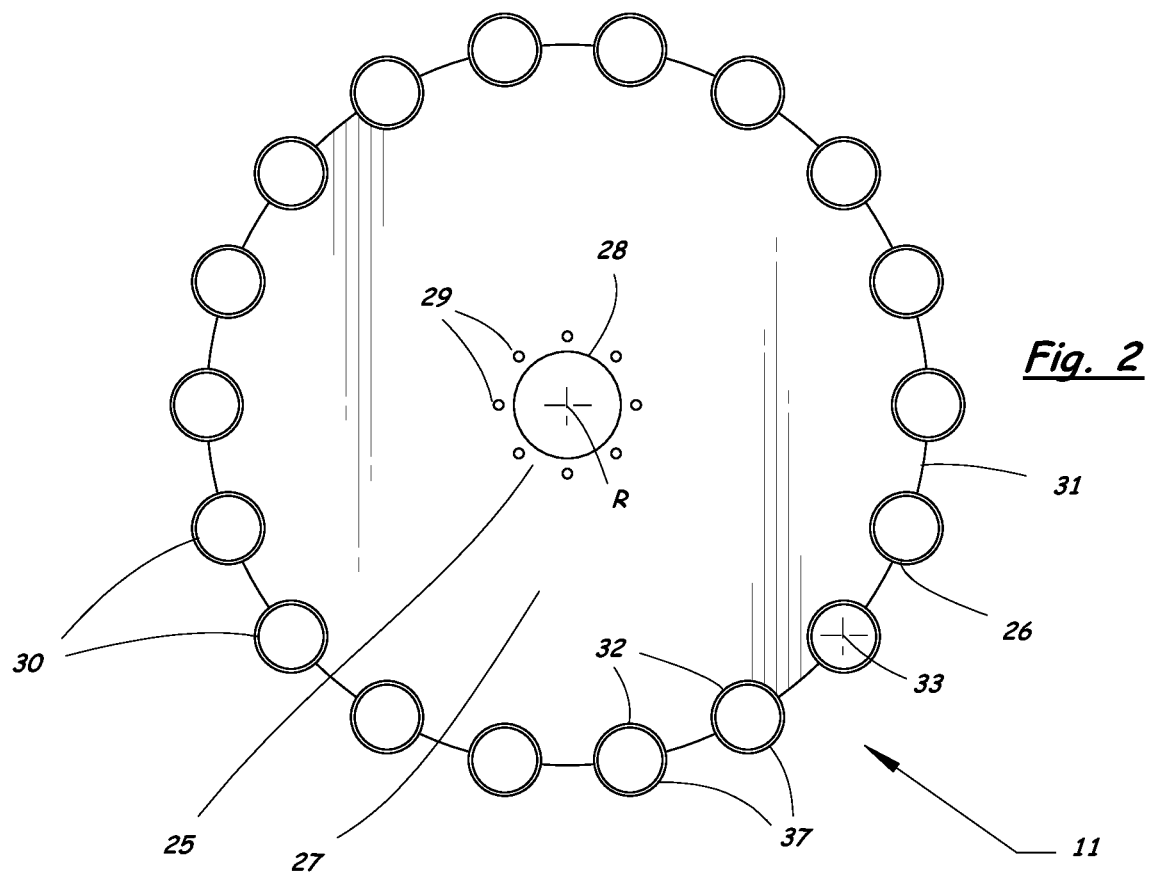
FIG. 2 is a front elevation view of a wheel apparatus according to the present invention.
Figure 3:
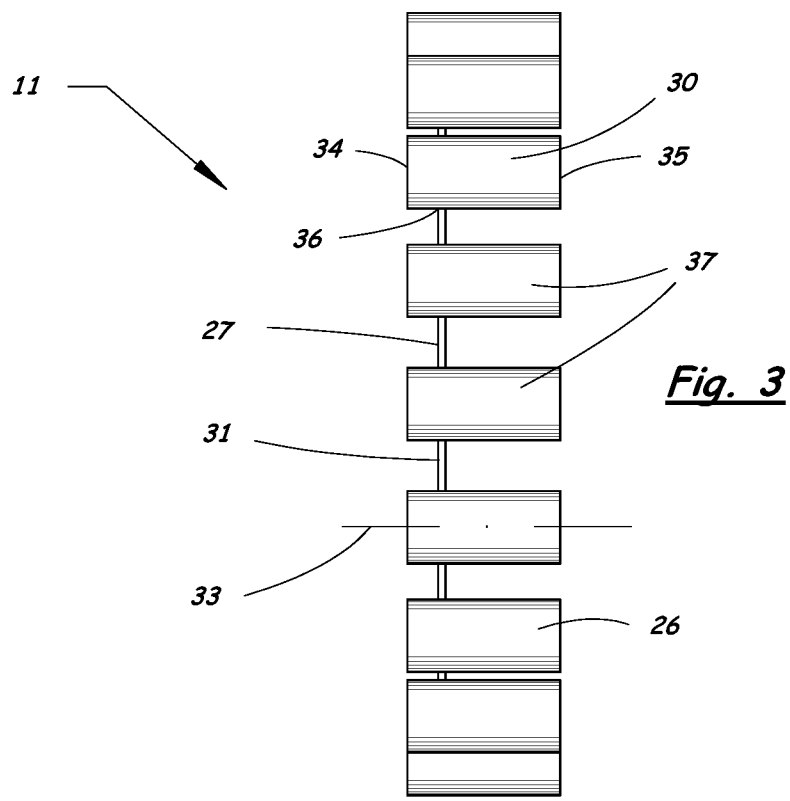
FIG. 3 is a side elevation view of the wheel apparatus shown in FIG. 1.
Figure 4:
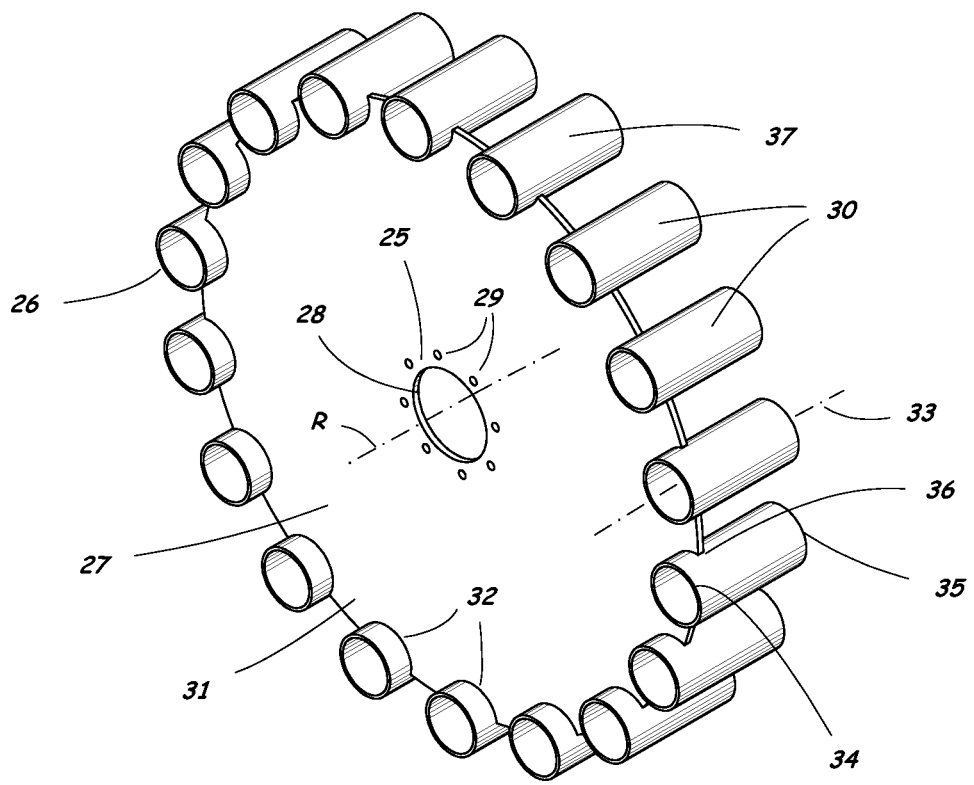
FIG. 4 is a perspective rear view of the wheel apparatus.
Figure 5:
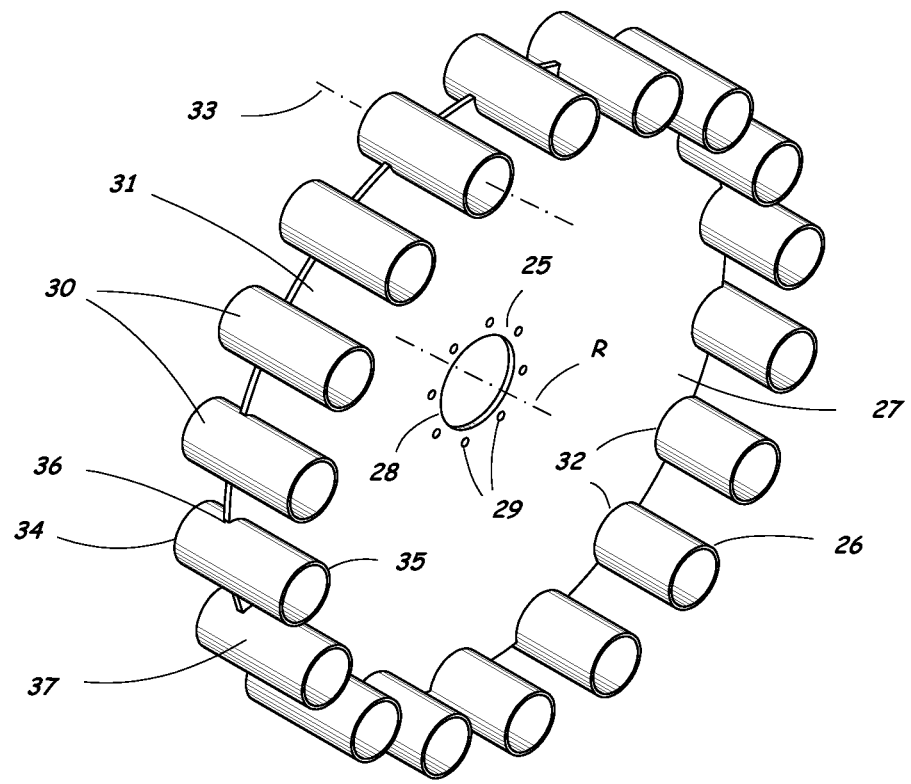
FIG. 5 is a perspective front view of the wheel apparatus.

As illustrated in FIG. 1, the self-propelled irrigation system 10 includes an elevated water distribution pipeline 12 connected to a water supply, and a support tower assembly 13 that supports the pipeline 12 above the crop being irrigated. A plurality of drop nozzles 14 or other types of sprinkler heads are spaced along the length of the pipeline 12. The support tower assembly 13 is supported on wheels 11 that are driven to move the irrigation system 10 over a field.

The support tower assembly 13 includes a base beam 15 and support frame members 16, 17 that extend between the ends 18, 19 of the base beam 15 and the elevated pipeline 12. In the illustrated embodiment, a center drive motor 20 is mounted near the midpoint of the base beam 15, and wheel gearboxes 21, 22 are attached to the respective ends 18, 19 of the base beam 15. A driveshaft (not shown) extends between the center drive motor 20 and the wheel gearboxes 21, 22 to provide a rotating drive force to the wheel gearboxes 21, 22.

Each of the wheel gearboxes 21, 22 has an output shaft that serves as a drive axle 23 for the wheel apparatus 11. A mounting hub 24 is secured on the axle 23, and the wheel apparatus 11 is mounted to the hub 24 using a plurality of threaded lug bolts, lug nuts, or the like. The drive axle 23, mounting hub 24 and wheel apparatus 11 are driven to rotate about an axis of rotation R.

The wheel apparatus 11 has a center portion 25, a rim assembly 26, and a support structure 27 disposed between the center portion 25 and the rim assembly 26. The center portion 25 has a center cutout 28 and a plurality of mounting holes 29 surrounding the center cutout 28. The center cutout 28 fits over a corresponding structure on the mounting hub 24, and the mounting holes 29 receive the threaded lugs used to secure the wheel assembly 11 to the mounting hub 24.

The support structure 27 is integral with and extends radially outwardly from the center portion 25. The center portion 25 and the support structure 27 are constructed from a rigid metal plate, such as a one-half inch (½") thick steel plate.

The rim assembly 26 comprises a plurality of rigid members 30 that are spaced apart from each other and attached around the outer periphery 31 of the support structure 27. For example, the rigid members 30 can be spaced apart from each other a distance from centerline to centerline of approximately 150% to 300% of the diameter of the rigid members 30. In the illustrated embodiment, the rigid members 30 are spaced apart a distance from centerline to centerline of approximately 200% of the diameter of the rigid members 30, thereby leaving a space between adjacent rigid members 30 approximately equal to the diameter of the rigid members 30.

The outer periphery 31 of the support structure 27 can be notched so that the rigid members 30 fit into notched recesses 32 and are welded to the support structure 27. The welded connection for each of the rigid members 30 in the notched recesses 32 will extend around a substantial portion (e.g., 30 to 50%) of the circumference of the rigid member 30, thereby increasing the strength of the welded connection with the support structure 27.

The rigid members 30 have longitudinal axes 33 that are parallel with each other and that are parallel with and equidistant from the axis of rotation R. The rigid members 30 each have first and second ends 34, 35 and a mounting portion 36 between the first and second ends 34, 35. The mounting portion 36 is received in the notched recess 32 and welded to the support structure 27, as described above. The support structure 27 supports the rigid members 30 in a fixed position relative to the center portion 25 and the hub 24.

The rigid members 30 have cylindrical outer surfaces 37. The cylindrical outer surfaces 37 provide ground contacting surfaces that minimize stresses on the sprinkler system 10 and allow mud and debris to clear itself from the wheel apparatus 11 during operation.

In the illustrated embodiments, the rigid members 30 are pieces of cylindrical pipe. For example, the cylindrical pipe pieces 30 can have a diameter of approximately 4 to 5 inches and a length of approximately 8 to 12 inches. The support structure 27 can be sized so that the outer periphery 31 of the support structure 27 or the overall diameter of the wheel apparatus 11 is approximately the same diameter as the outer periphery of a typical pneumatic tire for a self-propelled irrigation system. For example, the outer periphery of the wheel assembly 11 can be approximately 42 to 60 inches.

The scope of the present invention is not limited to the dimensions of the various components of the wheel apparatus 11, which are stated herein by way of example only. The dimensions can be changed without departing from the scope of the invention. For example, the diameter of the pipe pieces 30 can be selected to be approximately 5 to 15% of the diameter of the wheel apparatus 11, and the length of the pipe pieces 30 can be approximately 10 to 40% of the diameter of the wheel apparatus 11. The rigid members 30 are arranged on the outer periphery 31 of the wheel apparatus 11 to contact the ground surface to support the irrigation system 10 during movement over a field. Spaces between the rigid members 30 allow mud and debris to pass freely between the rigid members 30 during operation to enhance traction while minimizing mud from being forced out of the wheel track.

The first and second ends 34, 35 of the rigid members 30 are free of any structural elements extending between adjacent rigid members 30. The spaces between adjacent rigid members 30, with the exception of the width of the flat metal plate of the support structure 27 on which the rigid members 30 are attached, are open and unobstructed to allow mud and debris to pass between the rigid members 30. In the embodiment illustrated in FIGS. 1 to 4, the rigid members 30 extend perpendicular to a plane of the support structure 27 with the first and second ends 34, 35 unsupported.

Figure 7:
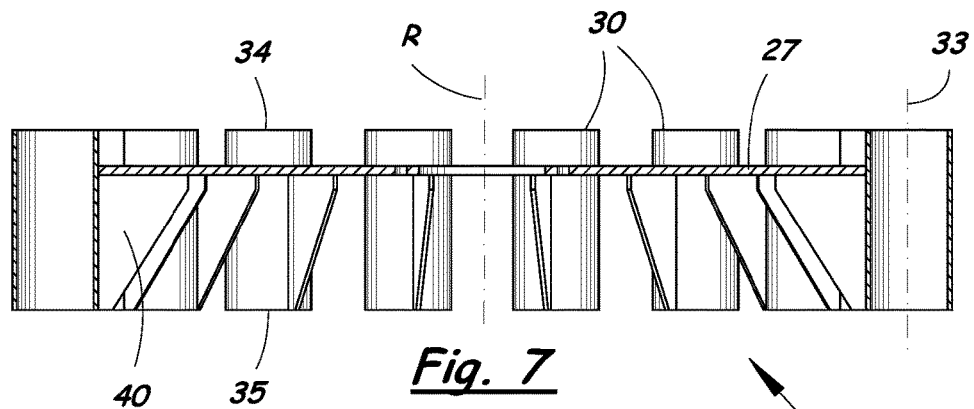
FIG. 7 is a cross section view of the wheel apparatus, as viewed along line 7-7 in FIG. 6.
Figure 6:
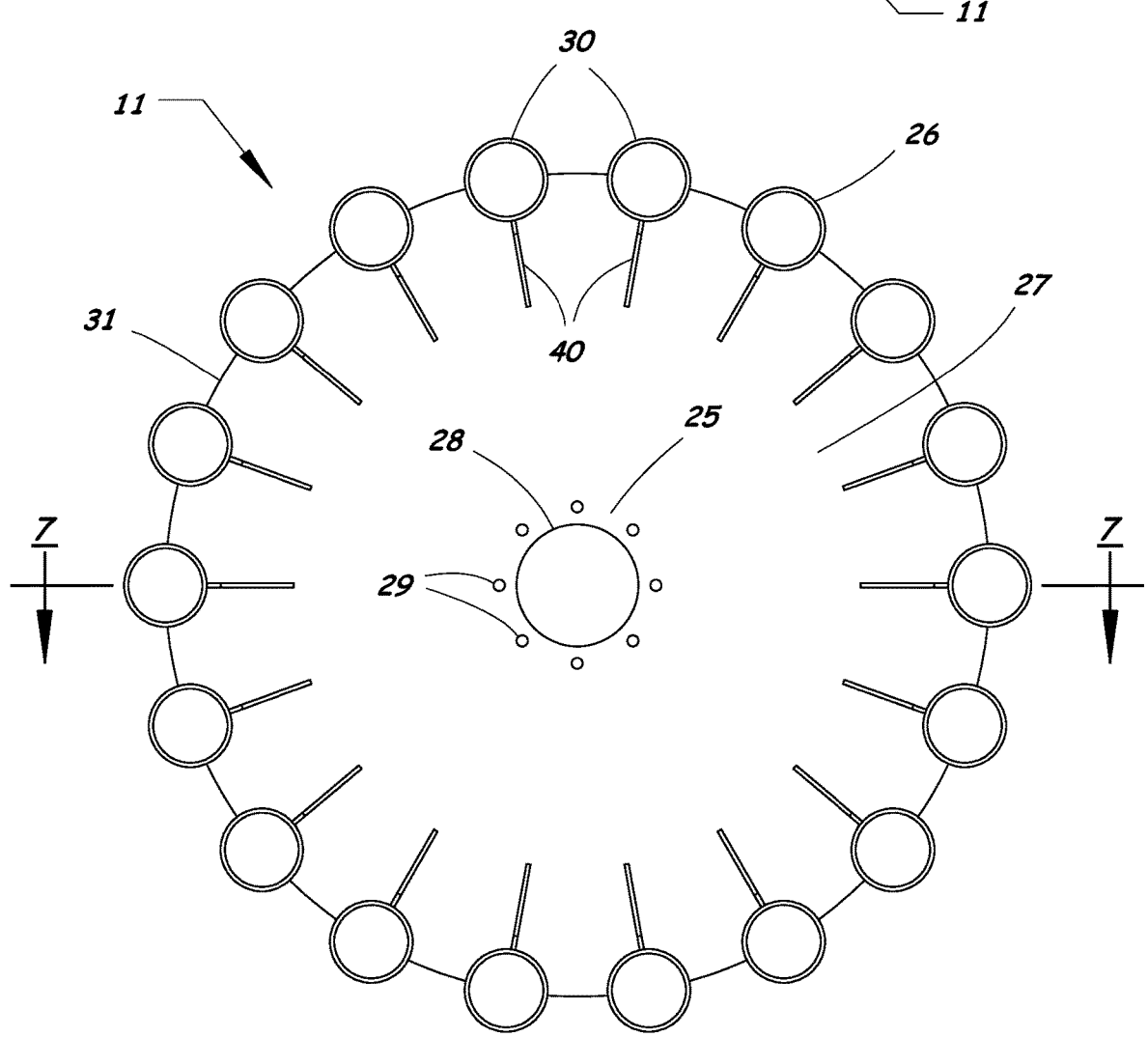
FIG. 6 is a front elevation view of a wheel apparatus according the present invention with gussets between the rigid members and the support structure for added strength.

In the embodiment illustrated in FIGS. 6 and 7, the rigid members 30 are welded to the support structure 27 and are further supported by gussets 40 fixed between the rigid members 30 and the support structure 27. The gussets 40 can be welded to the rigid members 30 and to the support structure 27 for strengthening the wheel apparatus 11. The gussets 40 are flat triangular members that extend radially inward from the rigid members 30 toward the axis of rotation R of the wheel apparatus 11. The ends 34, 35 of the rigid members 30 in this embodiment are free of any structural elements extending between adjacent rigid members 30.

Figure 9:
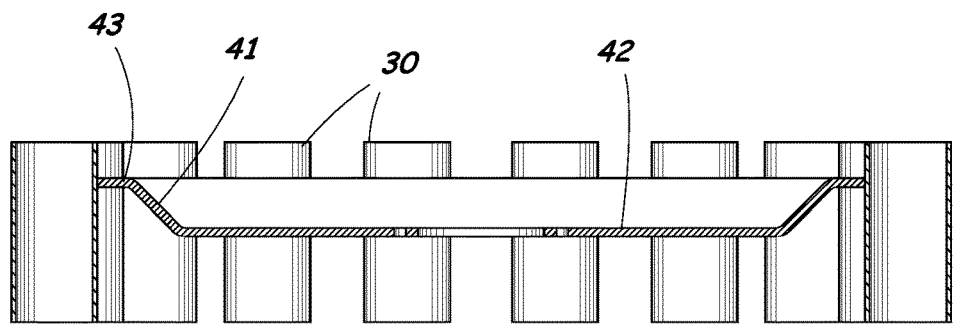
FIG. 9 is a cross section view of the wheel apparatus, as viewed along line 9-9 in FIG. 8.
Figure 8:
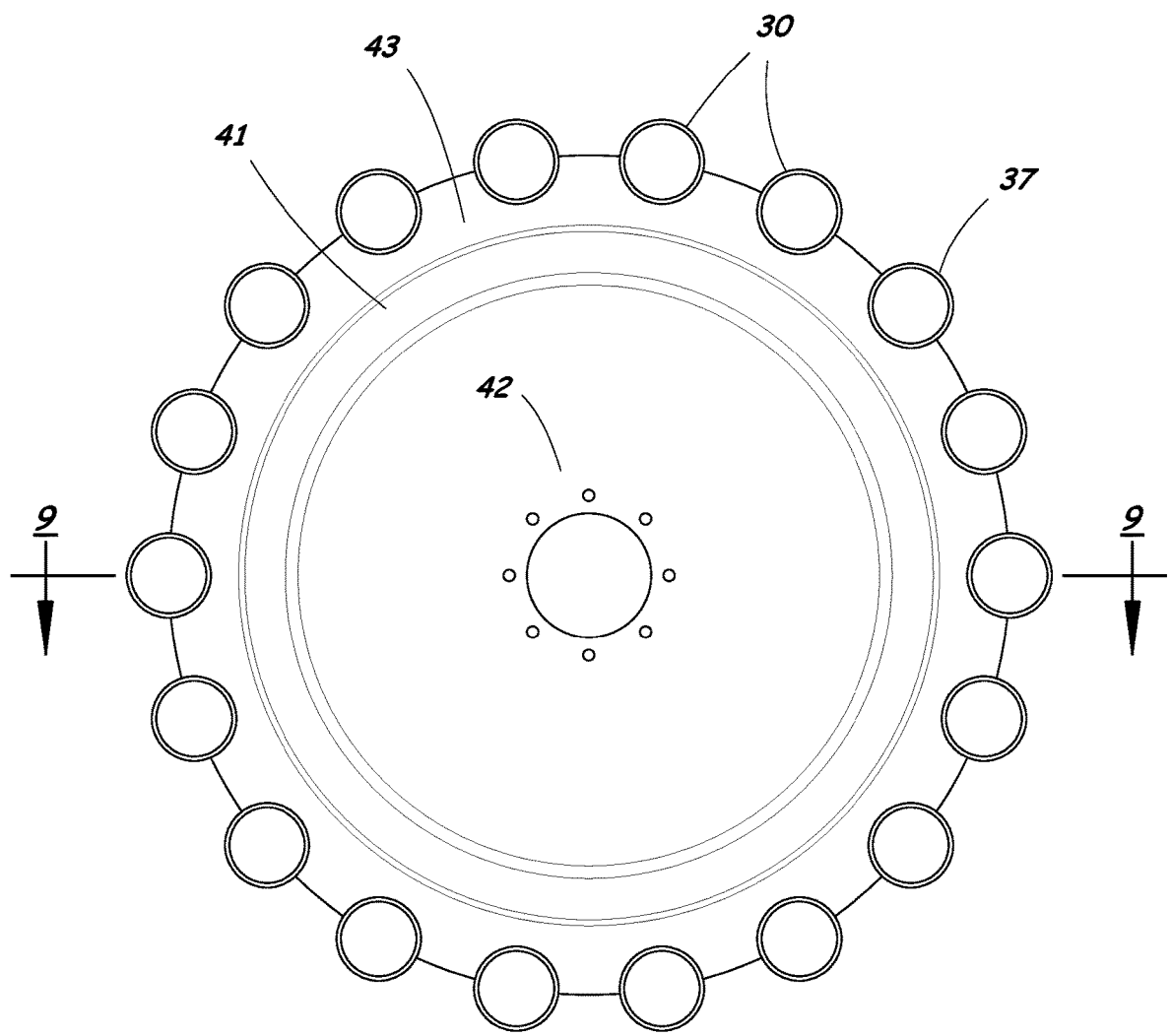
FIG. 8 is a front elevation view of a wheel apparatus according to the present invention with a transition portion between the hub and the support structure to offset the hub from the support structure in an axial direction.

In the embodiment illustrated in FIGS. 8 and 9, a transition portion 41 is provided in the wheel apparatus 11 between the center portion 42 and the support structure 43 to offset the center portion 42 from the support structure 43 in an axial direction. The axial offset provided by the transition portion 41 strengthens the wheel apparatus 11 and centers the wheel apparatus 11 over the hub 24 on the axle 23.

While the invention has been specifically described in connection with specific embodiments thereof, it is to be understood that this is by way of illustration and not of limitation, and the scope of the appended claims should be construed as broadly as the prior art will permit.

What is claimed is:

1. A wheel apparatus for an irrigation system, comprising:
   a center portion configured to couple with a hub on an axle of the irrigation system, said center portion having an axis of rotation;
   a rim assembly comprising a plurality of rigid members that are spaced apart from each other, said plurality of rigid members having longitudinal axes that are parallel with each other and that are equidistant from said axis of rotation, and said plurality of rigid members having first and second ends and a mounting portion between said first and second ends; and
   a support structure disposed between the center portion and the rim assembly configured to support the plurality of rigid members in a fixed position relative to said center portion, said mounting portion of said plurality of rigid members being connected to said support structure;
   said plurality of rigid members each have outer surfaces arranged to contact a ground surface to support the irrigation system above the ground surface with spaces between said plurality of rigid members allowing mud and debris to pass freely between the plurality of rigid members during operation to enhance traction while minimizing mud from being forced out of a wheel track with the irrigation system supported by contact between the outer surfaces of the plurality of rigid members and the ground surface;
   wherein said center portion and said support structure are integral with each other and constructed of a rigid metal plate, said plurality of rigid members are fixed to an outer periphery of said rigid metal plate and extend generally perpendicular to a plane of said rigid metal plate, said plurality of rigid members each comprises a length of pipe, said outer surfaces of said plurality of rigid members are cylindrical outer surfaces, said first and second ends of said plurality of rigid members are free of any structural elements extending between adjacent rigid members, and wherein spaces between said plurality of rigid members, with the exception of a width of the rigid metal plate, are open and unobstructed to allow mud and debris to pass between and around said plurality of rigid members.

2. The wheel apparatus according to claim 1, further comprising gussets fixed between said plurality of rigid members and said support structure, said gussets extending radially inward from said plurality of rigid members toward said axis of rotation for strengthening the apparatus.

3. The wheel apparatus according to claim 1, wherein said plurality of rigid members each have a diameter, and the longitudinal axes of adjacent rigid members are spaced apart from each other a distance of 150% to 300% of said diameter.

4. The wheel apparatus according to claim 1, wherein said longitudinal axes of said plurality of rigid members are generally parallel with the axis of rotation.

5. The wheel apparatus according to claim 1, wherein said wheel apparatus has a first diameter and said length of pipe has a second diameter, and wherein said second diameter is 5% to 15% of said first diameter.

6. The wheel apparatus according to claim 1, wherein said wheel apparatus has a first diameter and said rigid members have a length, and wherein said length of the plurality of rigid members is 10% to 40% of said first diameter.

7. The wheel apparatus according to claim 1, wherein said rigid metal plate comprises a transition portion between said center portion and said support structure so that said center portion is axially offset from said support structure.

8. A self-propelled irrigation system that includes a pipeline supported above a field by at least one support tower with a plurality of wheel drive assemblies, at least one of said wheel drive assemblies comprising:
   a center portion coupled with a hub on a drive axle, said center portion having an axis of rotation;
   a rim assembly comprising a plurality of rigid members that are spaced apart from each other, said plurality of rigid members having longitudinal axes that are parallel with each other and that are equidistant from said axis of rotation, and said plurality of rigid members having first and second ends and a mounting portion between said first and second ends; and
   a support structure disposed between the center portion and the rim assembly configured to support the plurality of rigid members in a fixed position relative to said center portion, said mounting portion of said plurality of rigid members being connected to said support structure;
   said plurality of rigid members each have outer surfaces arranged to contact a ground surface to support the irrigation system above the ground surface with spaces between said plurality of rigid members allowing mud and debris to pass freely between the plurality of rigid members during operation to enhance traction while minimizing mud from being forced out of a wheel track with the irrigation system supported above the ground surface by contact between the outer surfaces of the plurality of rigid members and the ground surface; and wherein said center portion and said support structure are integral with each other and constructed of a rigid metal plate, said plurality of rigid members are fixed to an outer periphery of said rigid metal plate and extend generally perpendicular to a plane of said rigid metal plate, said plurality of rigid members each comprises a length of pipe, said outer surfaces of said plurality of rigid members are cylindrical outer surfaces, said first and second ends of said plurality of rigid members are free of any structural elements extending between adjacent rigid members, and wherein spaces between said plurality of rigid members, with the exception of a width of the rigid metal plate, are open and unobstructed to allow mud and debris to pass between and around said plurality of rigid members.

9. The irrigation system according to claim 8, further comprising gussets fixed between said plurality of rigid members and said support structure, said gussets extending radially inward from said plurality of rigid members toward said axis of rotation for strengthening said at least one of said wheel drive assemblies.

10. The irrigation system according to claim 8, wherein said longitudinal axes of said plurality of rigid members are generally parallel with the axis of rotation of the hub.

11. The irrigation system according to claim 8, wherein said rigid metal plate comprises a transition portion between said hub and said support structure so that said center portion is axially offset from said support structure.

12. A self-propelled irrigation system that includes a pipeline supported above a field by at least one support tower with a plurality of wheel drive assemblies, at least one of said wheel drive assemblies comprising:

a center portion coupled with a hub on a drive axle, said center portion having an axis of rotation;

a rim assembly comprising a plurality of rigid members that are spaced apart from each other, said plurality of rigid members having longitudinal axes that are parallel with each other and that are equidistant from said axis of rotation, and said plurality of rigid members having first and second ends and a mounting portion between said first and second ends; and a support structure disposed between the center portion and the rim assembly configured to support the plurality of rigid members in a fixed position relative to said center portion, said mounting portion of said plurality of rigid members being connected to said support structure;

said plurality of rigid members each have outer surfaces arranged to contact a ground surface to support the irrigation system above the ground surface with spaces between said plurality of rigid members allowing mud and debris to pass freely between the plurality of rigid members during operation to enhance traction while minimizing mud from being forced out of a wheel track with the irrigation system supported above the ground surface by contact between the outer surfaces of the plurality of rigid members and the ground surface;

wherein said plurality of rigid members each comprises a length of pipe, said outer surfaces of said plurality of rigid members comprising cylindrical outer surfaces, said first and second ends of said plurality of rigid members are free of any structural elements extending between adjacent rigid members, said longitudinal axes of said plurality of rigid members are generally parallel with the axis of rotation, said center portion and said support structure are integral with each other and constructed of a rigid metal plate, said plurality of rigid members are fixed to an outer periphery of said rigid metal plate and extend generally perpendicular to a plane of said rigid metal plate, and wherein spaces between said plurality of rigid members, with the exception of a width of the rigid metal plate, are open and unobstructed to allow mud and debris to pass between and around said plurality of rigid members.

* * * * *